United States Patent [19]
Wojcik et al.

[11] Patent Number: 5,859,946
[45] Date of Patent: Jan. 12, 1999

[54] LIQUID-CORE LIGHT GUIDE DESIGNED TO WITHSTAND INTERIOR BUBBLE FORMATION FROM TEMPERATURE-INDUCED VOLUMETRIC VARIATIONS

[75] Inventors: Randolph Frank Wojcik, Yorktown; Stanislaw Majewski, Grafton; Carl John Zorn, Yorktown, all of Va.

[73] Assignee: Southeastern Univ. Research Assn., Newport News, Va.

[21] Appl. No.: 885,467

[22] Filed: Jun. 27, 1997

[51] Int. Cl.[6] .................................................. G02B 6/20
[52] U.S. Cl. ................................ 385/125; 385/147
[58] Field of Search ..................................... 385/125, 147; 359/900

[56] References Cited

U.S. PATENT DOCUMENTS 5,165,773  11/1992  Nath ......................................... 385/125
5,267,341  11/1993  Shearin ..................................... 385/125

Primary Examiner—Hung N. Ngo

[57] ABSTRACT

A termination for a light guide having optical cladding tubing and a liquid core includes a volumetric change device configured to allow fluid flow out of the tubing whenever the liquid core expands and to allow fluid flow into the tubing whenever the liquid core contracts, an end plug fixed to the tubing to retain the liquid in the liquid core within the tubing and the end piece and a crimping piece for holding the end plug in place.

39 Claims, 2 Drawing Sheets

LIQUID-CORE LIGHT GUIDE DESIGNED TO WITHSTAND INTERIOR BUBBLE FORMATION FROM TEMPERATURE-INDUCED VOLUMETRIC VARIATIONS

BACKGROUND OF THE INVENTION

1. Field of the Invention

The present invention relates to a design for core liquid retention for liquid core light guides and more particularly to a design for core liquid retention during temperature cycling between 0° F. and 140° F. for liquid core light guides.

2. Related Prior Art

In the use of liquid core light guides problems exist in temperature induced volumetric variations. Typically, the liquids that are used significantly change volume as a function of temperature, specifically the range of 0° F. (−18° C.) to 140° F. (60° C.). During the heating of a LLG (Liquid-core Light Guide) containing such a fluid, the pressure created by volumetric expansion of the liquid is sufficient to slightly deform (i.e., elongate) the Teflon™ tubing. This deformation is permanent, resulting in the formation of a small bubble when the liquid core light guide is returned to normal room temperature and the liquid undergoes volumetric contraction. This effect is rooted in the significant difference between the larger volumetric expansion coefficient of the liquid as compared to that of the FEP (Teflon™) tubing. The resultant bubble is large enough to drastically reduce the delivered light intensity from the liquid core light guide.

In a present commercial liquid core light guides, most commonly Series 300 from Lumatec of Munich Germany, the core liquid has a volumetric expansion coefficient that closely matches that of the Teflon™ tubing.

Several liquids are available that can be used to make a liquid core light guide transmit efficiently over a range from 350 to 800 nm., namely Dupont Syltherm XLT, General Electric SF-96-50, and Fluka UV-grade mineral oil. The first two are silicone oils (poly-dimethyl-siloxanes) and have been found to be radiation-hard under a 1,000 hour irradiation from ultra-violet (UV) light (centered at 365 nm) that varied in intensity from 1–4 W/cm². The third is not radiation-hard, but is a very efficient transmitter of visible and near-IR light. All three are relatively inexpensive. However, none of these possible liquids have a volumetric expansion coefficient that closely matches that of the Teflon™ tubing and were undesirable for operational use throughout the aforementioned temperature range because of the deleterious effects due to this difference.

In addition, three new high index of refraction fluids (1.49–1.58) have been identified that can be used for efficient visible light transmission, and moreover, these fluids can used as low toxicity, non-flammable liquid scintillator bases. These are first, phenyl-xylyl-ethane (PXE), second, linear alkylbenzene (LAB) and third, isopropyl-biphenyl (IPB). With the addition of typical scintillator fluors such as PTP, BPBD, POPOP, bis-MSB, TPB, BBQ, Y7 and 3HF, one can create an active scintillating medium for use in Nuclear Science applications requiring the flexibility afforded by the liquid core light guide. In the case of PXE and LAB, such liquid scintillators can be obtained from Fisher Scientific under the Scintisafe™ trademark.

When compared to a commercial reference standard liquid core light guide such as series 300 from Lumatec of Germany, a UV-grade liquid core light guide can deliver up to 85% of the UV intensity (365 nm) of the Lumatec liquid core light guide at a much lower cost. However, the liquid core light guide cannot withstand a temperature cycling test such as the following. First, from room temperature, cool the liquid core light guide to 0° F. for 72 hours, and then return to room temperature. Second, proceed to heat the liquid core light guide to 1400° F. for 72 hours, and then return to room temperature.

During the cooling cycle, the liquid is seen to contract leaving a vacuum air bubble. Upon reheating (slowly) to room temperature, the bubble disappears and the liquid core light guide operates normally. However, after the light guide is heated and then allowed to cool as in the second step, one sees a bubble developing even though no leakage of fluid is detected. Studies of the volumetric expansion coefficient and measurements of the pressure developed during the heating of the light guide suggest strongly that the FEP Teflon™ is permanently deformed during the heating. This apparent increase in the tubing volume results in a slight underfilling of the tubing after the cooling to room temperature.

If the light guide can be used in normal room temperatures, for example from 600° to 80° F., then the normal design of the light guide can be used. For cases where the light guide operates in normal temperature conditions, but may be exposed to extreme temperatures for a short time, such as during shipping, or in cases where the light guide may have to operate in abnormal temperature conditions, an alternate design is required.

The following patents are indicative of the state of the art addressing this problem of bubble formation during the cooling process after heating.

U.S. Pat. No. 5,33,227, titled "Optical Waveguide Hose", issued to Minoru Ishiharada et al., relates to an optical waveguide hose including a hollow tubular cladding, a fluid core in the cladding, the fluid having a higher index of refraction than the cladding, and sealing plugs mated with opposite end opening of the cladding. In one form, the core fluid is filled in the cladding under positive pressure. In another form, a sheath of gas barrier material encloses the outer periphery of the cladding. The pressurized fluid core of the gas barrier sheath prevents air from penetrating into the core, allowing the hose to maintain its light transmission function.

International Patent Application, PCT publication number WO 95/121138, published on May 4, 1995, titled "Liquid Core Optical Waveguide", applied for by Frederick Harold Eastgate, relates to an optical waveguide for transmitting radiation. In one embodiment the waveguide includes a flexible tube of a material that is substantially transparent to the radiation, and a liquid core filling the tube having a refractive index greater than that of the tube material. In another embodiment the waveguide includes a tube having an inner lining, and a liquid core filling the tube and having a refractive index greater than that of the lining material. In a still further embodiment there is an optical waveguide for transmitting radiation and functioning as a non-imaging concentrator. The waveguide includes a tube having an input end and/or an output end that is greater than the diameter of the tube body.

U.S. Pat. No. 3,995,934, titled "Flexible Light Guide", issued to Gunther Nath, relates to a flexible light guide of the liquid filled type with a liquid supply container outside the light guide. In accordance with one form of the device described, a flexible light guide has a column, operating as an optic fiber or a liquid, which absorbs as little as possible of the wavelength range to be transmitted, with a predetermined index of refraction. This column is surrounded by a flexible tube of plastics material, which, in the wavelength range to be transmitted, has a somewhat lesser index of refraction than the liquid. In accordance with the device described, such a light guide has a supply container filled at least partly with the liquid and connected with the interior of the flexible tube.

The presence of the supply container ensures that the flexible tube is always completely filled with the light conducting liquid, even if in the course of time liquid should be lost from the tube. The supply container furthermore ensures satisfactory filling of the flexible tube and high transmission of the light guide even on bending of the flexible tube and in the case of high thermal loading of the liquid column owing to high intensities of radiation.

The foregoing methods and apparatus, although each effective for its limited purpose, do not solve the problem presented of permanent deformation of the Teflon™ tubing caused by the pressure created by the volumetric expansion of the liquid during the heating of a liquid-core light guide, resulting in the formation of a small bubble when the light guide is returned to normal room temperature.

SUMMARY OF THE INVENTION

The present invention provides a method is described to deal with liquids that significantly change volume as a function of temperature, specifically the range of 0° F. (−18° C.) to 140° F. (60° C.). It is found that during the heating of a liquid core light guide containing such a fluid, the internal pressure created by the liquid expansion is sufficient to slightly deform (i.e., elongate) the Teflon™ tubing. This deformation in the Teflon™ tubing is permanent, resulting in the formation of a small bubble when the liquid core light guide is returned to normal room temperature. This effect is rooted in the significant difference between the larger volumetric expansion coefficient of the liquid as compared to that of the tubing. The resultant bubble is large enough to drastically reduce the delivered light intensity from the light guide.

The present invention provides a practical method to prevent this effect by preventing any bubble formation during the temperature cycling between 0° F. (−18° C.) and 140° F. (60° C.). By preventing bubble formation during the temperature cycling process, the liquid core light guide can be operated throughout this temperature range without deleterious effects. This improvement allows a wider range of fluids to be used as the liquid core.

If the light guide can be used in normal room temperatures, for example from 60° to 80° F., then the normal design of the light guide can be used. For cases where the light guide is normally used at room temperature, but may be exposed to extreme temperatures for a short time, such as during shipping or in cases where the light guide may have to operate in abnormal temperature conditions, an alternate design has been developed.

Important features of the present invention are, first, to provide a flexible, elastic outer sheathing to the FEP Teflon™ tubing and, second, to allow a slight leakage of the core liquid into the space between the teflon and the sheath while crimping around the concentric layers of sheathing, teflon and the end plug. The FEP Teflon™ tubing, acts as the light guide optical cladding. The sheath will act as a bladder or concentric buffer allowing the core liquid to change volume without deforming the teflon tubing. Furthermore, when the liquid core light guide is put through a freeze cycle, the buffer volume will allow the central FEP tubing to remain filled with the fluid, thereby allowing the light guide to operate throughout the desired temperature range. The central FEP Teflon™ tube has two small incisions made at diametrically opposite points to allow for fluid flow between the FEP tubing and the outer concentric fluoroelastomer tubing. The incisions are small enough to minimize any disturbance in the optical path. As temperature variations force volumetric changes in the fluid, the liquid can seep between this concentric buffer and inner FEP tubing without exerting excess force upon the inner FEP tubing. This structure is only necessary at one end of the light guide. Crimping rings are applied at two points so as to seal in place the end plug, FEP tubing and the fluoroelastomer bladder.

An alternate embodiment of the present invention may include a short piece of teflon tubing for example, twice the length of the end plug, connected to the end plug. The inner teflon tubing and the sheath are both filled with the core liquid. The short piece of teflon is inserted loosely into the inner teflon tube to permit fluid communication between the inner tubing and the outer sheath.

A further alternate embodiment may include a short piece of teflon tubing is omitted, and the endplug inserted slightly into the inner Teflon™ tube. The crimp is around the sheath and endplug, leaving the inner Teflon™ tube free to permit fluid communication between the inner tube liquid and the sheath liquid.

An additional alternate embodiment of the present invention may include a design where the inner Teflon™ tubing and sheath are the same lengths, the crimp is around all three materials, but a small incision is made in the tubing to allow core liquid seepage and while permitting minimal interruption in the optical cladding path.

Another alternate embodiment of the present invention may include a design where all the tubing is FEP Teflon™. In this case, the pressure relief is provided by a short section of corrugated FEP Teflon™. To maintain optical continuity, an FEP Teflon™ tubing insert slightly longer than the corrugated section is used to guide the injected light past the corrugated section.

The present invention provides a termination for a light guide having optical cladding tubing and a liquid core that includes a volumetric change device configured to allow fluid flow out of the tubing whenever the liquid core expands and to allow fluid flow into the tubing whenever the liquid core contracts, an end plug fixed to the tubing to retain the liquid in the liquid core within the tubing and the end piece and a crimping piece for holding the end plug in place. In a first embodiment, the volumetric change device includes a bladder section over the tubing adjacent to the end plug, the bladder section held over the tubing at one end by the crimping piece, a second crimping piece holding the bladder section over the tubing at another end of the bladder section and a channel portion in the tubing to permit fluid communication between liquid in the tubing and liquid in the bladder section. In a second embodiment, the volumetric change device includes a flexible outer sheath extending over the length of the tubing and held in place over the end plug by the crimping piece and an insert portion arranged to be fixed to the end plug and loosely fitted to the tubing to permit fluid communication between liquid in the tubing and liquid in the flexible outer sheath. In a third embodiment, the tubing fits loosely over the end plug and the volumetric change device includes a flexible outer sheath extending over the length of the tubing and held in place over the end plug by the crimping piece. In a fourth embodiment, the tubing fits under the end plug and the tubing is held in place by the crimping piece and the volumetric change device includes a flexible outer sheath extending over the length of the tubing and held in place over the end plug by the crimping piece and a channel portion in the tubing to permit fluid communication between liquid in the tubing and liquid in the bladder section. In a fifth embodiment, the tubing includes a corrugated section immediately prior to the end plug and the volumetric change device includes an insert portion arranged to be fixed to the end plug and extending into the tubing covering the corrugated section to provide an optical cladding path.

DESCRIPTION OF THE PREFERRED EMBODIMENT

Figure 1:
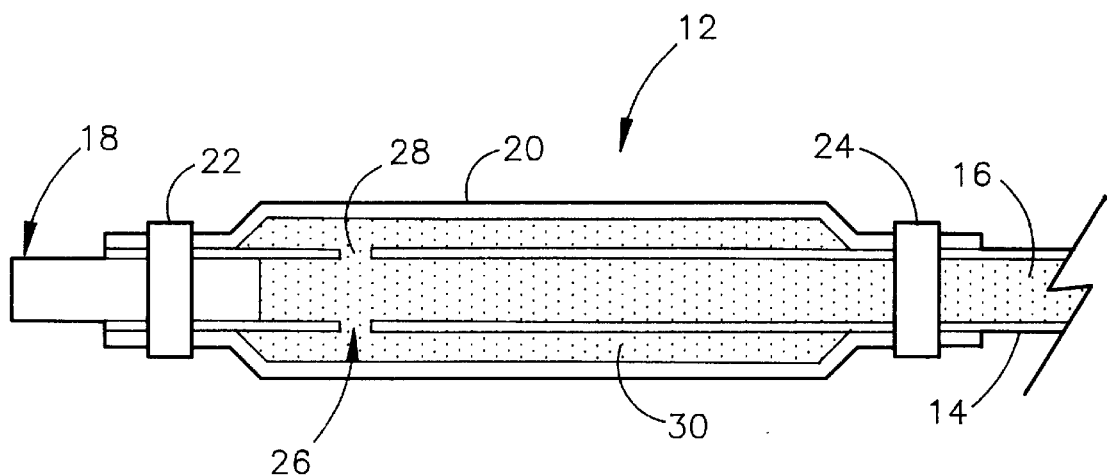
FIG. 1 is a cross sectional view of a practical working version of a Liquid-core Light Guide.

The present invention provides a method and apparatus that deals with liquids that significantly change volume as a function of temperature, specifically the range of 0° F. (−18° C.) to 140° F. (60° C.). It is found that during the heating of a liquid core light guide containing such a fluid, the internal pressure created by the liquid expansion is sufficient to slightly deform (i.e., elongate) the Teflon™ tubing. This deformation in the Teflon™ tubing is permanent, resulting in the formation of a small bubble when the liquid core light guide is returned to normal room temperature. This effect is rooted in the significant difference between the larger volumetric expansion coefficient of the liquid as compared to that of the tubing. The resultant bubble is large enough to drastically reduce the delivered light intensity from the light guide.

The present invention provides a practical method to prevent this effect by preventing any bubble formation during the temperature cycling between 0° F. (−18° C.) and 140° F. (60° C.). By preventing bubble formation during the temperature cycling process, the liquid core light guide can be operated throughout this temperature range without deleterious effects. This improvement allows a wider range of fluids to be used as the liquid core. In a present commercial liquid core light guides, most commonly Series 300 from Lumatec of Munich Germany, the core liquid has a volumetric expansion coefficient that closely matches that of the Teflon™ tubing. This fortuitous equality is no longer necessary with the designs of the present invention.

Several liquids are available that can be used to make a liquid core light guide transmit efficiently over a range from 350 to 800 nm., namely Dupont Syltherm XLT, General Electric SF-96-50, and Fluka UV-grade mineral oil.

The first two are silicone oils (poly-dimethyl-siloxanes) and have been found to be radiation-hard under a 1,000 hour irradiation from ultra-violet (UV) light (centered at 365 nm) that varied in intensity from 1–4 W/cm$^2$. The third is not radiation-hard, but is a very efficient transmitter of visible and near-IR light. All three are relatively inexpensive. However, none of these possible liquids have a volumetric expansion coefficient that closely matches that of the Teflon™ tubing and were undesirable for operational use over throughout this temperature range because of the deleterious effects due to the difference in coefficients of expansion.

In addition, three new high index of refraction fluids (1.49–1.58) have been identified that can be used for efficient visible light transmission, and moreover, these fluids can used as low toxicity, non-flammable liquid scintillator bases. These are first, phenyl-xylyl-ethane (PXE), second, linear alkylbenzene (LAB) and third, isopropyl-biphenyl (IPB). With the addition of typical scintillator fluors such as PTP, BPBD, POPOP, bis-MSB, TPB, BBQ, Y7 and 3HF, one can create an active scintillating medium for use in Nuclear Science applications requiring the flexibility afforded by the liquid core light guide. In the case of PXE and LAB, such liquid scintillators can be obtained from Fisher Scientific under the Scintisafe™ trademark.

When compared to a commercial reference standard liquid core light guide, series 300 from Lumatec of Germany, a UV-grade liquid core light guide can deliver up to 85% of the UV intensity (365 nm) of the Lumatec LLG and at a much lower cost. However, previously, the liquid core light guide cannot withstand a temperature cycling test such as the following. First, from room temperature, cool the liquid core light guide to 0° F. for 72 hours, and then return to room temperature. Second, proceed to heat the liquid core light guide to 140° F. for 72 hours, and then return to room temperature.

During the cooling cycle, the liquid is seen to contract leaving a vacuum air bubble. Upon reheating (slowly) to room temperature, the bubble disappears and the liquid core light guide operates normally. However, after the light guide is heated and then allowed to cool as in the second step, one sees a bubble developing even though no leakage of fluid is detected. Studies of the volumetric expansion coefficient and measurements of the pressure developed during the heating of the light guide suggest strongly that the FEP Teflon™ is permanently deformed during the heating. This apparent increase in the tubing volume results in a slight underfilling of the tubing after the cooling to room temperature.

If the light guide can be used in normal room temperatures, for example from 60° to 80° F., then the normal design of the light guide can be used. For cases where the light guide is normally used at room temperature, but may be exposed to extreme temperatures for a short time, such as during shipping or in cases where the light guide may have to operate in abnormal temperature conditions, an alternate design has been developed.

FIG. 1 is a cross-sectional view of a first embodiment of the apparatus of the present invention. Liquid core light guide 12 is comprised of FEP tubing 14 with liquid core 16. FEP tubing 14 is closed at the illustrated end by plug 18 to retain liquid core 16. A flexible sheath or bladder 20 is fitted over FEP tubing 14 and is held in place by two crimp rings 22 and 24 at either end of bladder 20. Crimping ring 22 also holds plug 18 in place at the end of FEP tubing 14. FEP tubing 16 is provided with small incisions or channels 26 and 28 in the section covered by bladder 20 to permit fluid communication between the section 30.defined by bladder 20 and liquid core 16 of light guide 12.

An important feature of the present invention is to provide a flexible, elastic outer sheathing or bladder 20 to FEP tubing 14. The latter, FEP tubing 14, acts as the liquid core light guide 12 optical cladding. A second important feature is to allow fluid communication, even if only a slight leakage, of core liquid 16 into the space between FEP tubing 14 and the sheath or bladder 20, while crimping around the concentric layers of sheathing or bladder 20, FEP tubing 14 and end plug 18 with crimping rings 22 and 24 to form section 30. The sheath or bladder 20 will act as a concentric buffer, allowing core liquid 16 to change volume without deforming FEP tubing 14.

Furthermore, when liquid core light guide 12 is put through a freeze cycle, the buffer volume will allow central FEP tubing 14 to remain filled with liquid 16, thereby allowing light guide 12 to operate throughout the range of 0° F. to 140°. FEP tubing 14 has two small incisions 26 and 28 made at opposite points to allow for fluid flow between FEP tubing 14 and outer concentric fluoroelastomer bladder 20 (e.g., Viton™, Fluran™). This elastometric tubing or bladder 20 is compatible with the liquid (that is, does not deteriorate the optical properties of the fluid), and acts as a pressure relief bladder. Incisions or channels 26 and 28 are small enough to minimize any disturbance in the optical path. As temperature variations force volumetric changes in the fluid, liquid 16 can seep between this concentric buffer, bladder 20 and FEP tubing 14 without exerting excess force upon inner FEP tubing 14. This structure is only necessary at one end of light guide 12. Crimping rings 22 and 24 are applied at two points so as to seal in place end plug 18, FEP tubing 14 and the fluoroelastomer bladder 20.

It is important that sheath or bladder 20 section be both elastic and compatible with core liquid 16. Specifically, silicone oils are known to leach out plasticizers from materials such as polyethylene and PVC, resulting in a degradation in the optical transmission capability of the liquid and causing stress-cracking in the plastic. Rubbers such a chloroprene (Neoprene™), isobutylene-isoprene (butyl), nitrile-butadiene (Nitril Buna N), and fluororubbers (VitonTM and Fluorel™) are known to be compatible with the silicone oils. Other possible candidates include Tygon™, silicones, Silastic™, Fluran™, Nalgene™ (polyurethane), Norprene™, and PharMed™.

Figure 2:
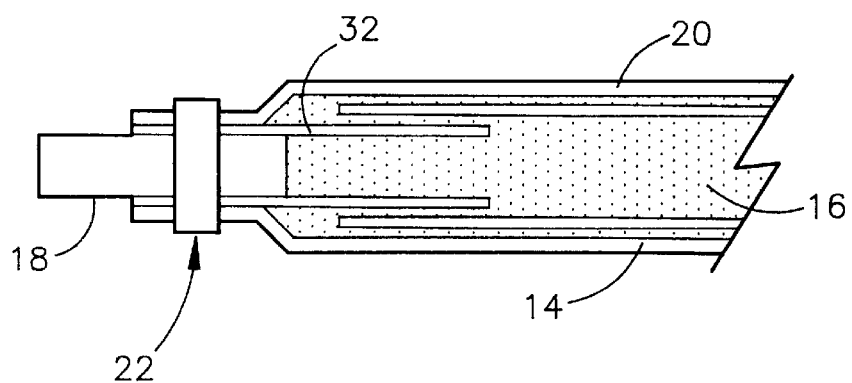
FIG. 2 is a cross sectional view of a second embodiment of the liquid core light guide of FIG. 1 to prevent bubble formation after temperature cycling.

FIGS. 2 through 5 illustrate alternate embodiments of the present invention. In FIG. 2, a short piece 32 of FEP tubing is fixed to a portion of endplug 18. Piece 32 may, for example, be twice the length of endplug 18. FEP tubing 14 and a flexible outer sheath 34 are both filled with core liquid 16. Short piece 32 of FEP is inserted into FEP tubing 14. The inner diameter and wall thickness of FEP tubing 14 is chosen so as to provide as close a fit as possible (while maintaining sufficient flexibility). In this way, the close fit provides an essentially uninterrupted optical cladding path while allowing the slow seepage of core liquid 16 between FEP tubing 14 and flexible outer sheath 20 during large temperature variations.

Figure 3:
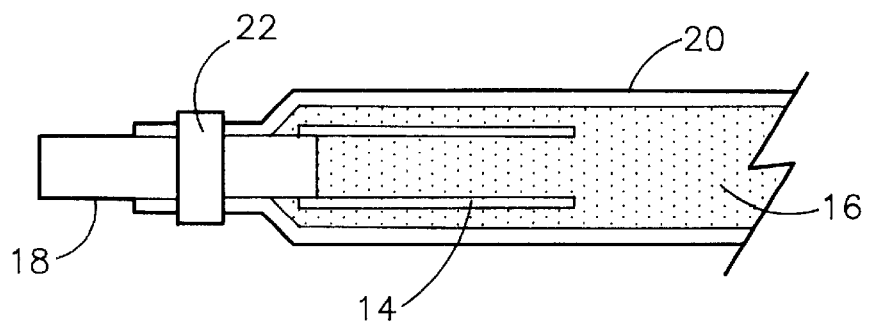
FIG. 3 is a cross sectional view of a third embodiment of the liquid core light guide of FIG. 1 with inner FEP tubing positioned onto endplug but not crimped.

In FIG. 3, short piece 32 of teflon tubing is omitted, and endplug 18 is inserted slightly into FEP tubing 14. Crimping ring 22 is around flexible outer sheath 20 and endplug 18. The seepage of core liquid 16 occurs at the insertion point of endplug 18 and FEP tubing 14.

Figure 4:
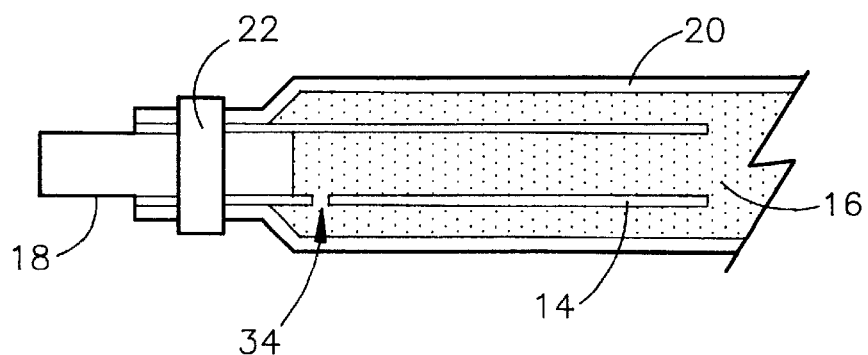
FIG. 4 is a cross sectional view of a fourth embodiment of the liquid core light guide of FIG. 1 with both outer flexible sheath and inner FEP teflon crimped onto endplug, with a small incision in FEP tubing.

FIG. 4 illustrates a fourth embodiment of the present invention. FEP tubing 14 and flexible outer sheath 20 are the same lengths, crimping ring 22 is around all three materials, but a small incision 34 is made in FEP tubing 14 to allow core liquid 16 seepage and minimal interruption in the optical cladding path.

Figure 5:
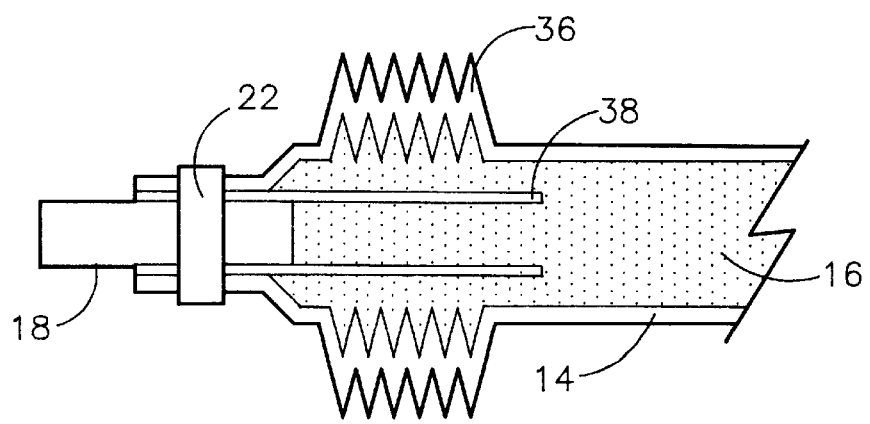
FIG. 5 is a cross sectional view of a fifth embodiment of the liquid core light guide of FIG. 1 where the sheath is FEP teflon including a short corrugated piece of FEP teflon tubing.

FIG. 5 shows the embodiment of the present invention where all tubing is FEP teflon. In this case, the pressure relief is provided by a short section 36 of corrugated FEP Teflon™. To maintain optical continuity, a short FEP tubing insert 38 is used to guide the injected light past corrugated section 36.

While there has been illustrated and described a particular embodiment of the present invention, it will be appreciated that numerous changes and modifications will occur to those skilled in the art, and it is intended in the appended claims to cover all those changes and modifications which fall within the true spirit and scope of the present invention.

We claim:

1. A termination for a light guide having optical cladding tubing and a liquid core, the termination comprising:
    volumetric change device configured to allow fluid flow out of the tubing whenever the liquid core expands and to allow fluid flow into the tubing whenever the liquid core contracts;
    an end plug fixed to the tubing to retain the liquid in the liquid core within the tubing and said end piece; and
    crimping piece for holding said end plug in place.

2. The termination for a light guide having optical cladding tubing and a liquid core according to claim 1 wherein said volumetric change device includes:
    bladder section over the tubing adjacent to said end plug, said bladder section held over the tubing at one end by said crimping piece;
    a second crimping piece holding said bladder section over the tubing at another end of said bladder section; and
    channel portion in the tubing to permit fluid communication between liquid in the tubing and liquid in said bladder section.

3. The termination for a light guide having optical cladding tubing and a liquid core according to claim 2 wherein said liquid core is a silicone oil.

4. The termination for a light guide having optical cladding tubing and a liquid core according to claim 2 wherein said liquid core is selected from a group including phenyl-xylyl-ethane (PXE), linear alkylbenzene (LAB) and isopropyl-biphenyl (IPB).

5. The termination for a light guide having optical cladding tubing and a liquid core according to claim 4 wherein said liquid core includes a scintillator fluors chosen from the group of PTP, BPBD, POPOP, bis-MSB, TPB, BBQ, Y7 and 3HF.

6. The termination for a light guide having optical cladding tubing and a liquid core according to claim 2 wherein said bladder section is made from a material selected from the group of rubbers chloroprene (Neoprene™), isobutylene-isoprene (butyl), nitrile-butadiene (Nitril Buna N).

7. The termination for a light guide having optical cladding tubing and a liquid core according to claim 2 wherein said bladder section is made from a material selected from the group of fluororubbers including Viton™ and Fluorel™.

8. The termination for a light guide having optical cladding tubing and a liquid core according to claim 2 wherein said bladder section is made from a material selected from the group including Tygon™, silicones, Silastic™, Fluran™, Nalgene™ (polyurethane), Norprene™, and PharMed™.

9. The termination for a light guide having optical cladding tubing and a liquid core according to claim 1 wherein said volumetric change device includes:
    flexible outer sheath extending over the length of the tubing and held in place over said end plug by said crimping piece;

insert portion arranged to be fixed to said end plug and loosely fitted to the tubing to permit fluid communication between liquid in the tubing and liquid in said flexible outer sheath.

10. The termination for a light guide having optical cladding tubing and a liquid core according to claim 9 wherein said liquid core is a silicone oil.

11. The termination for a light guide having optical cladding tubing and a liquid core according to claim 9 wherein said liquid core is selected from a group including phenyl-xylyl-ethane (PXE), linear alkylbenzene (LAB) and isopropyl-biphenyl (IPB).

12. The termination for a light guide having optical cladding tubing and a liquid core according to claim 11 wherein said liquid core includes a scintillator fluors chosen from the group of PTP, BPBD, POPOP, bis-MSB, TPB, BBQ, Y7 and 3HF.

13. The termination for a light guide having optical cladding tubing and a liquid core according to claim 9 wherein said flexible outer sheath is made from a material selected from the group of rubbers chloroprene (Neoprene™), isobutylene-isoprene (butyl), nitrile-butadiene (Nitril Buna N).

14. The termination for a light guide having optical cladding tubing and a liquid core according to claim 9 wherein said flexible outer sheath is made from a material selected from the group of fluororubbers including Viton™ and Fluorel™.

15. The termination for a light guide having optical cladding tubing and a liquid core according to claim 9 wherein said flexible outer sheath is made from a material selected from the group including Tygon™, silicones, Silastic™, Fluran™, Nalgene™ (polyurethane), Norprene™, and PharMed™.

16. The termination for a light guide having optical cladding tubing and a liquid core according to claim 1 wherein the tubing fits loosely over said end plug and said volumetric change device includes:
    flexible outer sheath extending over the length of the tubing and held in place over said end plug by said crimping piece.

17. The termination for a light guide having optical cladding tubing and a liquid core according to claim 16 wherein said liquid core is a silicone oil.

18. The termination for a light guide having optical cladding tubing and a liquid core according to claim 17 wherein said liquid core is selected from a group including phenyl-xylyl-ethane (PXE), linear alkylbenzene (LAB) and isopropyl-biphenyl (IPB).

19. The termination for a light guide having optical cladding tubing and a liquid core according to claim 18 wherein said liquid core includes a scintillator fluors chosen from the group of PTP, BPBD, POPOP, bis-MSB, TPB, BBQ, Y7 and 3 HP.

20. The termination for a light guide having optical cladding tubing and a liquid core according to claim 16 wherein said flexible outer sheath is made from a material selected from the group of rubbers chloroprene (Neoprene™), isobutylene-isoprene (butyl), nitrile-butadiene (Nitril Buna N).

21. The termination for a light guide having optical cladding tubing and a liquid core according to claim 16 wherein said flexible outer sheath is made from a material selected from the group of fluororubbers including Viton™ and Fluorel™.

22. The termination for a light guide having optical cladding tubing and a liquid core according to claim 16 wherein said flexible outer sheath is made from a material selected from the group including Tygon™, silicones, Silastic™, Fluran™, Nalgene™ (polyurethane), Norprene™, and PharMed™.

23. The termination for a light guide having optical cladding tubing and a liquid core according to claim 1 wherein the tubing fits under said end plug and the tubing is held in place by said crimping piece and said volumetric change device includes:
    flexible outer sheath extending over the length of the tubing and held in place over said end plug by said crimping piece; and
    channel portion in the tubing to permit fluid communication between liquid in the tubing and liquid in said bladder section.

24. The termination for a light guide having optical cladding tubing and a liquid core according to claim 23 wherein said liquid core is a silicone oil.

25. The termination for a light guide having optical cladding tubing and a liquid core according to claim 23 wherein said liquid core is selected from a group including phenyl-xylyl-ethane (PXE), linear alkylbenzene (LAB) and isopropyl-biphenyl (IPB).

26. The termination for a light guide having optical cladding tubing and a liquid core according to claim 25 wherein said liquid core includes a scintillator fluors chosen from the group of PTP, BPBD, POPOP, bis-MSB, TPB, BBQ, Y7 and 3HF.

27. The termination for a light guide having optical cladding tubing and a liquid core according to claim 23 wherein said flexible outer sheath is made from a material selected from the group of rubbers chloroprene (Neoprene™), isobutylene-isoprene (butyl), nitrile-butadiene (Nitril Buna N).

28. The termination for a light guide having optical cladding tubing and a liquid core according to claim 23 wherein said flexible outer sheath is made from a material selected from the group of fluororubbers including Viton™ and Fluore™.

29. The termination for a light guide having optical cladding tubing and a liquid core according to claim 23 wherein said flexible outer sheath is made from a material selected from the group including Tygon™, silicones, Silastic™, Fluran™, Nalgene™ (polyurethane), Norprene™, and PharMed™.

30. The termination for a light guide having optical cladding tubing and a liquid core according to claim 1 wherein the tubing includes a corrugated section immediately prior to said end plug and said volumetric change device includes:
    insert portion arranged to be fixed to said end plug and extending into the tubing covering said corrugated section to provide an optical cladding path.

31. The termination for a light guide having optical cladding tubing and a liquid core according to claim 30 wherein said liquid core is a silicone oil.

32. The termination for a light guide having optical cladding tubing and a liquid core according to claim 30 wherein said liquid core is selected from a group including phenyl-xylyl-ethane (PXE), linear alkylbenzene (LAB) and isopropyl-biphenyl (IPB).

33. The termination for a light guide having optical cladding tubing and a liquid core according to claim 32 wherein said liquid core includes a scintillator fluors chosen from the group of PTP, BPBD, POPOP, bis-MSB, TPB, BBQ, Y7 and 3HF.

34. A method for terminating a light guide having optical cladding tubing and a liquid core, the method comprising:

allowing fluid flow out of the tubing whenever the liquid core expands and to allow fluid flow into the tubing whenever the liquid core contracts using a volumetric change device;

retaining the liquid in the liquid core within the tubing and said end piece with an end plug fixed to the tubing; and holding said end plug in place.

35. The method for terminating a light guide having optical cladding tubing and a liquid core according to claim 34 wherein said allowing step includes:

providing a bladder section over the tubing adjacent to said end plug, said bladder section held over the tubing at one end by said crimping piece;

holding said bladder section over the tubing at another end of said bladder section; and providing a channel portion in the tubing to permit fluid communication between liquid in the tubing and liquid in said bladder section.

36. The method for terminating a light guide having optical cladding tubing and a liquid core according to claim 34 wherein said allowing step includes:

extending a flexible outer sheath over the length of the tubing and holding said flexible outer sheath in place over said end plug by said crimping piece;

arranging a insert portion to be fixed to said end plug and loosely fitted to the tubing to permit fluid communication between liquid in the tubing and liquid in said flexible outer sheath.

37. The method for terminating a light guide having optical cladding tubing and a liquid core according to claim 34 wherein the tubing fits loosely over said end plug and said allowing step includes:

extending a flexible outer sheath over the length of the tubing and holding said flexible sheath in place over said end plug by said crimping piece.

38. The method for terminating a light guide having optical cladding tubing and a liquid core according to claim 34 wherein the tubing fits under said end plug and the tubing is held in place by said crimping piece and said allowing step includes:

extending a flexible outer sheath over the length of the tubing and holding said flexible sheath in place over said end plug by said crimping piece; and providing a channel portion in the tubing to permit fluid communication between liquid in the tubing and liquid in said bladder section.

39. The method for terminating a light guide having optical cladding tubing and a liquid core according to claim 34 wherein the tubing includes a corrugated section immediately prior to said end plug and said allowing step includes:

inserting a portion arranged to be fixed to said end plug and extending into the tubing covering said corrugated section to provide an optical cladding path.

* * * * *